United States Patent [19]

Mahadevan

[11] Patent Number: 5,714,185
[45] Date of Patent: Feb. 3, 1998

[54] PROTECTED FEED PRODUCT

[75] Inventor: Subramaniam Mahadevan, Nepean, Canada

[73] Assignees: Her Majesty the Queen in right of Canada, as represented by the Minister of Agriculture; Agri-Food's, both of Canada

[21] Appl. No.: 695,331

[22] Filed: Aug. 9, 1996

Related U.S. Application Data

[63] Continuation of Ser. No. 240,340, May 10, 1994, abandoned.

[51] Int. Cl.$^6$ ..................................................... A23K 1/18
[52] U.S. Cl. .......................... 426/93; 424/438; 426/630; 426/635; 426/807
[58] Field of Search ..................... 426/93, 630, 635, 426/807; 424/438, 442

[56] References Cited

U.S. PATENT DOCUMENTS

| | | |
|---|---|---|
| 3,336,128 | 8/1967 | Holik et al. . |
| 3,619,200 | 11/1971 | Ferguson et al. . |
| 4,042,718 | 8/1977 | Rawlings ................................. 426/807 |

OTHER PUBLICATIONS

Dairy Research Report, Mahadevan, S, A new Process for Protecting Soybean Meal from Rumen Degradation. 1990 pp. 54–56.

Proceedings from the Canadian Society of Animal Science 42nd Annual Conference. Jul. 5–9, 1992. Atwal, A.S. et al. Abstract 0800–27. Increasing Milk and Milk Protein Production by Feeding Fishmeal or Chemically Protected Soybean Meal.

Journal of Animal Science, vol. 60, No. 4, 1985. pp. 1072–1080 Spears, J.W. et al. Nitrogen Utilization and Ruminal Fermentation in Steers Fed Soybean Meal Treated with Formaldehyde.

Animal Feed Science and Technology, 25 (1989) 111–122. Waltz et al. Evaluation of Various Methods from Protecting Soya–Bean Protein from Degradation by Rumen Bacteria.

Journal of Animal Science, vol. 65, Supplement 1, 1987 Abstract 741, Vande Haar, M.J., et al. A New Method to Protect Compounds from Ruminal Degradation using the Corn Protein Zein.

J. Sci. Food Agric. 1986, 37, 742–752. Finlayson et al the Effect of Methanal (Formaldehyde) Treatment of Casein on its Digestion in vivo and in vitro.

J. Agric. Food Chem. 1991, 39, 351–355. Wang et al. Anatioxidative Mechanism of Maize Zein in Powder Model Systems against Methyl Linoleate: Effect of Water Activity and Coexistence of Antioxidants.

*Primary Examiner*—Daniel Stemmer
*Attorney, Agent, or Firm*—Eckert Seamans Cherin & Mellott

[57] ABSTRACT

The diets of ruminant animals include proteins which are, unfortunately, largely degraded in the rumen. Therefore, most of the protein is not available to the animal in the intestine where the nutrients can be properly absorbed and utilized by the animal. The present invention overcomes this problem by providing a composition that can be applied to a feed product in order to protect it from degradation in the rumen. In particular, the composition comprises about 10% w/v zein and from about 1 to about 2% formaldehyde in an aqueous alcohol solution. The invention also includes the method for protecting the feed product as well as the protected feed product.

16 Claims, No Drawings

PROTECTED FEED PRODUCT

This is a continuation of application Ser. No. 08/240,340, filed May 10, 1994, now abandoned.

FIELD OF THE INVENTION

The present invention relates to a process for protecting animal feed against degradation in the rumen. The invention also includes the protected feed product produced according to the process of the present invention.

BACKGROUND OF THE INVENTION

The diets of ruminant animals are generally supplemented with proteins. The most common protein supplements are oil seed meal proteins such as soybean and canola. Unfortunately, these proteins are subjected to extensive (up to 80%) degradation in the rumen caused by ruminal microorganisms. The protein degraded in the rumen is not available to the animal for absorption in the intestine resulting in a loss of 80% of the nutritional value of the protein. This is not a very efficient utilization of the feed, which is especially problematic in animals having increased nutritional requirements such as lactating dairy cows and fast growing animals such as beef cattle (1, 2, 3).

Therefore, there is a need to somehow protect the protein from degradation in the rumen in order to make it available to the animal in the intestine where it can be properly absorbed. This would allow the animal to get increased nutritional benefit from the feed. Increasing the nutritional benefit of the feed can reduce the amount of feed required by the animals.

One approach to solving this problem has been to modify or protect the dietary protein by a variety of chemical and physical methods so that the protein escapes degradation in the rumen. Such methods should allow the degradation of the proteins in the intestine where the required amino acids can be absorbed. Heating soybean meal has shown some promise in producing protected proteins however the results were highly variable (4, 5). Underheating the protein resulted in no protection while overheating the protein resulted in the degradation of important essential amino acids. Physical coating (6, 7) of the proteins has been tested with materials such as fats and calcium soaps of fats. However, such products have not been proven to be very successful. Feed proteins have also been treated with formaldehyde and other aldehydes (8, 9) resulting in a protected protein product. However, the formaldehyde also resulted in the destruction and reduced availability of most essential amino acids (10, 11, 12). Furthermore, the levels of formaldehyde used in the prior art processes are generally not acceptable for a feed product (13).

In view of the above, there is a real need to provide a method of treating feed proteins in order to protect them from degradation in rumen while allowing them to be degraded in the intestine.

SUMMARY OF THE INVENTION

The present invention relates to coating feed products with formaldehyde treated zein. The invention includes the composition for protecting the feed, the method of preparing the composition, the method of protecting the feed as well as the protected feed product.

According to one aspect of the present invention there is provided a composition for protecting a feed product comprising from about 5 to about 20% w/v zein and from about 0.4 to about 0.72 w/v formaldehyde in an aqueous alcohol solution. In a preferred embodiment, the zein is present at about 10% w/v.

According to another aspect of the present invention, there is provided a protected feed product that has been coated with a composition comprising from about 5 to about 20% w/v zein and from 0.4 to about 0.72 w/v formaldehyde in an aqueous alcohol solution.

According to yet another aspect of the present invention, there is provided a method for preparing a composition for protecting a feed product comprising:

(a) providing a zein solution in aqueous alcohol containing from about 10 to about 40% w/v zein;

(b) adjusting the pH of the zein solution to from about 7.4 to about 7.6;

(c) adding formaldehyde to the zein solution to provide a formaldehyde-zein solution containing from about 0.8 to about 1.44% w/v formaldehyde;

(d) diluting the formaldehyde-zein solution approximately 1:2 with alcohol.

According to a further aspect of the present invention, there is provided a method for producing a protected feed product comprising:

(a) providing a zein solution in aqueous alcohol containing from about 10 to about 40% w/v zein;

(b) adjusting the pH of the zein solution to from about 7.4 to about 7.6;

(c) adding formaldehyde to the zein solution to provide a formaldehyde-zein solution containing from about 0.8 to about 1.44 w/v formaldehyde;

(d) diluting the formaldehyde-zein solution approximately 1:2 with alcohol; and (f) applying the diluted formaldehyde-zein solution to a feed product.

Zein is naturally occurring protein polymer derived from corn. It is insoluble in water and consequently is not easily degraded in the rumen. When it is treated with formaldehyde in an alcohol solution it forms a tough film insoluble in water. This film can be sprayed on to soybean meal to form a highly efficient protective coating on the meal. The coating is sensitive to degradation by the acid in the stomach (or abomasum) of the ruminant.

The levels of formaldehyde used in the present method are very low and are not strong enough to react with the amino acids of the soybean meal. In addition, the formaldehyde solution in alcohol is not very reactive. Furthermore, the formaldehydezein solution is applied to the meal in an opened aerated system which allows for the rapid evaporation of the formaldehyde.

The resulting protected product provides up to 90% protection in the rumen. There is clearly a synergistic effect between the formaldehyde and the zein as each of these when used alone only provides between 50 and 60% protection.

DETAILED DESCRIPTION OF A PREFERRED EMBODIMENT

PREPARATION OF ZEIN 80 kilograms of zein was dissolved in 400 liters of 75% aqueous ethanol to obtain a 20% solution w/v of zein. The pH of the resulting solution is usually acidic (pH 5 to 5.5), and is adjusted to 7.4 to 7.6 by the careful slow addition of a (50%) solution of sodium hydroxide. The solution is prepared in an industrial type mixing vessel (600 liter capacity) made of stainless steel. The vessel is fitted with a powerful propeller stirrer driven by an explosion proof motor. The pH is controlled by a portable pH meter. The stirring is continued for at least 1 hour with constant monitoring of the pH to maintain the pH between 7.4 and 7.6.

TREATMENT OF DISSOLVED ZEIN WITH FORMALDEHYDE

Commercial Formalin (36% w/v solution of formaldehyde) is used. For each batch of 400 liters of 20% zein solution prepared as described above, 16 liters of formalin (36% formaldehyde solution) is added. The formalin is added slowly at the rate of approximately 500 ml per minute with the aid of a peristaltic pump. All through the addition of the formalin, the zein solution is kept vigorously stirring. Addition of formalin results in the rapid drop of pH from 7.4 indicating reaction between the protein and formaldehyde. The pH is continuously monitored and is maintained at pH 7.4 to 7.6 by the slow and careful addition of sodium hydroxide solution. The pH should not be allowed to rise above 7.6. When all of the formalin has been added, the stirring is continued for an additional 2 hrs. with occasional checks of pH.

DILUTION OF THE TREATED ZEIN SOLUTION

The formaldehyde treated zein described in the previous section is divided into two 200 liter batches. Each batch is diluted with an equal volume of 95% ethanol. Dilution and mixing is done with the same equipment used above. After stirring for 30 minutes to ensure thorough mixing, the solution is pumped into 2 drums (200 liters each). Thus the original zein solution after dilution becomes a total of 800 liters, (4 drums of 200 liters each). The concentration of zein is 10% w/v. The drums are sealed and stored at room temperature for periods ranging from 1 to 2 weeks before use. The solution is stable and can be kept for at least one month. At this stage most of the reaction between the zein and formaldehyde is complete.

The dilution of the treated zein with 95% ethanol serves many purposes.

1) The concentration of zein is reduced to 10% so that a final coating of 4% zein on soybean meal can be obtained. The diluted solution is applied twice to give a more uniform and stronger coating.

2) The dilution reduces the concentration of the unreacted formalin in the zein solution to one half so that the reactivity of formaldehyde with soybean protein is much reduced.

3) By the addition of 95% ethanol, the ethanol concentration is increased from 75% to 85–87%. The reaction rate of proteins with formaldehyde is very much reduced at such concentrations of ethanol so that any reaction of residual formaldehyde with soybean meal proteins is considerably decreased.

4) The rate of evaporation of 87% ethanol is much higher than that of 75% ethanol. The final product is dried easily. The rapid evaporation of ethanol results in the simultaneous rapid evaporation of formaldehyde. This not only removes the formaldehyde rapidly but also reduces the chances of formaldehyde reacting with soybean meal proteins.

Separate laboratory experiments have shown that about 2400 grams out of the 5760 grams of formaldehyde (the amount present in the 16 liters of formalin used for the treatment) would have reacted with the zein and become bound to it.

SPRAYING OF SOYBEAN MEAL WITH THE TREATED ZEIN SOLUTION

Commercial soybean meal supplied as feed supplement is used. The soybean meal from the storage bunk above is delivered into a horizontal feed mixer (1 tonne at a time). A sprayer assembly of 6 jets is fitted on the inside of the mixer. Positive air pressure is maintained in the mixer with a vertical vent to the atmosphere. This aids in the aeration of the soybean meal and in the evaporation of the alcohol. The sprayer assembly is connected to an air-driven pump.

The diluted solution of formaldehyde treated zein (200 liters) is sprayed on 1 tonne of soybean meal which is being mixed in the horizontal mixer. The rate of spraying is approximately 200 liters in 30 minutes, although a slower rate may also work. The mixing is carried out throughout the spraying and is continued for an additional 2 hours. The above process is repeated with a second batch of the diluted zein solution (200 liters). Consequently, each tonne of soybean meal is coated twice. The total amount of treated zein used for each tonne is 40 kg (4% of the weight of soybean meal used) resulting in a 4% coating.

After the two coatings of zein are applied to the meal in the horizontal mixer, the meal is transferred by conveyor to vertical feed mixer and mixed overnight with aeration. At this stage all ethanol and any residual formaldehyde and most of the water has evaporated. The dry "protected" soybean meal is bagged (25 kg per bag) in plastic bags and stored until used for feeding.

Two tonne batches are made on each occasion using the 800 liters of diluted solution of formaldehyde treated zein.

PROTECTED SOYBEAN PRODUCT

The protected soybean meal prepared according to the above described process is an easy flowing dry meal. Laboratory analysis of the product demonstrated that the total formaldehyde content was only 0.07% of the dry weight of the meal. This is a much lower level as compared to the level seen in the prior art processes.

Each batch of protected soybean was tested for rumen stability by the dacron bag technique which is described below.

DACRON BAG TECHNIQUE

In the dacron bag procedure a weighed amount (5 grams) of the untreated or treated meal contained in specially made dacron bags are suspended in the rumen of cows fitted with a rumen fistula. After definite time periods in the rumen (0.6, 24 hrs) the bags are removed, washed, dried and the amounts of dry matter and protein remaining in the bag are analytically determined. The percent (as compared to the original material taken in the bag before the rumen incubation) gives a measure of protection. The amount of protein left over in the bag when unprotected soybean meal was used was in the range of 10 to 15%. The corresponding values for the "protected" meals were in the range of 85 to 90% indicating very high rumen protection.

Amino acid analysis of untreated and treated meal showed that there was insignificant change in the amino acid composition due to the treatment.

ANIMAL EXPERIMENTS

EXPERIMENT A—SHEEP

The effect of protecting soybean meal (SBM) from microbial degradation in the rumen on duodenal flow of microbial and feed nitrogen (N) was studied with sheep. The sheep experiments were done in collaboration with Dr. M. Ivan at the Centre for Food and Animal Research, Agriculture and Agri-Food Canada, Ottawa, Canada.

MATERIALS AND METHODS

Eight Canadian Arcott wethers (46 to 49 kg) with normal ruminal microflora and microfauna, each containing a surgically implanted ruminal cannula (14) and a duodenal reentrant cannula (15), were used. Surgery was performed a minimum of 2 months before the initiation of the experiment and was according to the procedure described by Ivan and Johnston (15). Special emphasis was placed on humane treatment of wethers before and during the experiment.

Fourteen days before the initiation of measurements, the wethers were allocated to two groups of four animals and placed in metabolism cages (16) in a temperature-controlled room. One group received a corn silage-based diet supplemented with normal SBM (NSBM) and the other the same diet supplemented with protected SBM (PSBM) (Table 1). The new method developed and reported by Mahadevan (17) was used for protection of SBM from microbial degradation in the rumen. The NSBM and PSBM provided equal amounts of N from identical components. Approximately 1 kg $d^{-1}$ of dry matter (DM) was delivered to each wether in 12 equal portions, at 2-h intervals, by an automatic feeder (18). All wethers had continuous access to drinking water.

After they had received the experimental diets for 14 d, sampling of feed and feces was initiated from all eight wethers. Total fecal output for each wether was collected and subsampled daily for 5 d. Fecal samples were freeze-dried, homogenized, and stored for chemical analysis. Fecal collection was followed by 2-d collections of duodenal digesta (12 h each day) and by samplings of ruminal contents on two consecutive days.

Each duodenal digesta collection (12 h) was carried out between 06:00 and 18:00 h as described by Ivan et al. (19). A 10% sample was accumulated for each wether from the two consecutive 12-h collections and freeze-dried. A small portion of the daily feed was accumulated as a sample and freeze-dried. The concentration of chromium in feed and digesta samples was used as a marker for calculation of the daily duodenal digesta flow.

Ruminal contents (600 mL) were obtained via ruminal cannula from each wether between 10:00 and 11:00 h, approximately 1 h after a feeding. The contents were immediately strained through eight layers of cheesecloth; the particle residue was discarded and after measuring pH the ruminal fluid fraction was divided into two parts. One part was used for chemical analyses, while the second part was centrifuged at 150×g for 10 min. The supernatant was again centrifuged at 30,000×g for 30 min and the pellet (bacterial fraction) freeze-dried. The pellet from the first centrifugation (150×g) was washed three times with saline and centrifuged after each washing at 150×g for 10 min. The residual pellet (protozoal fraction) was freeze-dried.

The method of Goering and Van Soest (20) was used for the determination of acid detergent fibre (ADF), and the Kjeldahl procedure was used for the estimation of N. Organic matter (OM) was calculated as DM loss on ashing at 550° C. Ammonia N was determined by phenol-hypochlorite reaction (21). Nonammonia N was estimated by subtraction of ammonia N from total N. Amino acids (including diaminopimelic acid) were measured by an amino acid analyzer (Beckman 121 MB, Beckman Instruments, Palo Alto, Calif.) as described by Moore and Stein (22), after hydrolysis in 6N HCl (23). Determination of volatile fatty acids (VFA) in ruminal fluid was as described previously (24). Diaminopimelic acid was used as a marker for the estimation of duodenal flow of bacterial N. Chromium was estimated by an air/acetylene flame atomic absorption spectrophotometer (Model 460, Perkin-Elmer, Norwalk, Conn.) after digestion with a mixture of nitric and perchloric acids. Measurements of phosphatidylcholine (25) in the protozoal fraction of ruminal contents and in duodenal digesta were carried out according to the method of Neill et al. (26) and used for estimation of the duodenal flow of protozoal N.

Data were submitted to least squares analysis of variance, using the GLM procedure of the Statistical Analysis System Institute, Inc. (27). Differences were treated as significant if $P \leq 0.05$.

RESULTS

RUMINAL NITROGEN AND pH

The pH in the rumen fluid was not different (P=0.17) between the NSBM diet and the PSBM diet (Table 2). There were also no appreciable differences between the two diets in the concentrations of total N (P=0.46) and NAN (P=0.57). The concentration of ammonia N was 18.2 and 13.2 mg 100 $mL^{-1}$ for the NSBM diet and the PSBM diet, respectively, but the differences were not significant (P=0.24).

VOLATILE FATTY ACIDS

The concentration of total VFA (Table 3) was lower (P=0.04) for the PSBM diet (78.11 mmol $L^{-1}$) than for the NSBM diet (96.21 mmol $L^{-1}$). The same pattern was also obtained for individual VFA, but the differences between the two diets were not significant for acetic and isovaleric acids. The molar proportion of valeric acid was lower (P=0.002) for the PSBM diet (0.99%) than for the NSBM diet (1.30%). The differences between the two diets in molar proportion of the rest of the VFA were not significant. The acetic acid:propionic acid ratios were not different (P=0.16).

DUODENAL FLOW OF NITROGEN

The differences between diets in total N and NAN flow from the stomach to the intestinal tract are not significant (Table 4). However, the flow of bacterial N decreased (P=0.05) and that of feed N increased (P=0.03) in sheep fed the PSBM diet as compared to sheep fed the NSBM diet. There was a tendency (P=0.09) for protozoal N flow to be higher for the PSBM diet (1.91 g $kg^{-1}$ OM intake) than for the NSBM diet (1.19 g $kg^{-1}$ OM intake). When expressed as percentage of the total NAN flow, the bacterial N fraction decreased from 83.0% for the NSBM diet to 61.2% for the PSBM diet, while the feed N fraction increased from 11.9% for the NSBM diet to 31.4% for the PSBM diet. The protozoal N fraction formed 5.1% and 7.4% for the NSBM diet and the PSBM diet, respectively. The apparent feed N degradability in the stomach decreased (P=0.03) from 88.7% for the NSBM diet to 66.5% for the PSBM diet.

The mean flow of individual essential and nonessential amino acids is summarized in Table 5. None of the differences between the NSBM diet and the PSBM diet were significant. The total amino acid flowing $kg^{-1}$ OM intake for the NSBM diet and the PSBM diet was 127.83 and 140.14, respectively. There was a similar pattern of flow for both essential and nonessential amino acids.

DIGESTIBILITY

The digestibilities of OM, ADF and N in the stomach and the total digestive tract are summarized in Table 6. None of the differences between the NSBM and the PSBM diets were significant.

DISCUSSION

The new process for protecting SBM has been well standardized so that SBM with 90% rumen resistance (as judged by the in situ dacron bag technique) is produced routinely in tonne quantities. Amino acid analysis of a number of samples of the protected SBM has shown that all amino acids are recovered to the extent of 97% or more, indicating that the process does not result in the destruction of important amino acids. With currently available processes such as heating or formaldehyde treatment, a high degree of protection can be achieved only at the expense of substantial and irreversible loss of amino acids such as lysine and tyrosine (28). These kinds of protection also lead to drastic reduction in the intestinal digestibility of the feed protein (28). As shown in Table 6, the protected protein prepared by the new process is as well digested as the untreated SBM. All these considerations make the SBM produced by the new process an excellent protected protein.

The protected SBM used in the present study had about 70% of the protein resistant to rumen degradation as judged by the dacron bag technique (data not shown). The results in Table 4 show that feeding this partially protected SBM resulted in a 3-fold increased supply of feed N from the stomach into the intestinal tract. However, the flow of total amino acids into the intestinal tract appeared to be the same for the NSBM- and the PSBM-fed animals. This apparent lack of increased flow of amino acids is mainly due to the reduced amount of bacterial protein flow (Table 4). The increased flow of dietary amino acids effectively compensated for the reduced bacterial protein. Although there was a tendency for increased protozoal N flow for the PSBM diet, this fraction appears to contribute very little (5 to 7% of NAN flow) to the protein nutrition of the host animal. Weller and Pilgrim (29) indicated that protozoa are sequestered within the rumen and only a small proportion of protozoal protein enters the small intestine. The decreased bacterial protein synthesis observed could be due to many factors, among which the availability of sufficient ammonia or peptide N, or both, could be the major constraints.

Satter and Slyter (30) suggested that concentrations of 5 to 8 mg ammonia N 100 mL$^{-1}$ rumen fluid are optimal for maximizing microbial growth yield, and that concentrations below 2 mg 100 mL$^{-1}$ are potentially limiting for microbial growth. However, optimum voluntary intake of low-N, low-digestibility forage by cattle was obtained when the ammonia N concentration in ruminal fluid was about 20 mg 100 mL$^{-1}$ (31). Leng (31) suggested that the above voluntary intake could have been stimulated by higher digestibility of the forage and hence increased ratio of microbial cells:VFA available from fermentative digestion, as ammonia N concentration increased up to 20 mg 100 mL$^{-1}$. The ammonia N concentration in ruminal fluid for both the NSBM diet and the PSBM diet in the present experiment was sufficient for maximal microbial growth yield if the suggestion of Satter and Slyter (30) is applied. However, there was an 18% decrease in bacterial N flow into the duodenum on the PSBM diet as compared to the NSBM diet. The ammonia N concentration in ruminal fluid for these diets was 13.2 and 18.2 mg 100 mL$^{-1}$, respectively. In addition, the mean digestibility in the stomach of ADF for the PSBM diet and the NSBM diet was 36.1 and 41.7%, respectively, while the total VFA production was 19% lower for the former diet. This evidence indicates that indeed under certain conditions a much higher ruminal concentration of ammonia N is required for maximizing bacterial growth yield than suggested by Satter and Slyter (30), and supports the value of about 20 mg ammonia N 100 mL$^{-1}$ ruminal fluid that was suggested by Leng (31).

Preliminary results from feeding experiments with beef cattle in our Centre, utilizing the same supplements, showed improved daily weight gains only when both supplements (NSBM and PSBM) were mixed and used in the diet in equal proportions (D. M. Veira—personal communication). Rooke and Armstrong (32) drew attention to the importance of a supply of ruminally degradable protein such as casein rather than nonprotein N such as urea in stimulating ruminal microbial N synthesis on silage-based diets. These authors pointed out that silage contains large quantities of nonprotein N in the form of ammonia and amino acids, but according to Chen et al. (33) ruminal bacteria have a preference for peptide N, which might be supplied by ruminally degradable protein. Hafley et al. (34) concluded that in growing cattle grazing warm-season grass ruminally degraded protein was needed for maximum forage digestion. Thus feeding too highly protected protein in the absence of sufficient easily degradable protein might result in reduced bacterial growth yield and digestibilities of other feed components in the rumen.

CONCLUSION

Ruminal bacteria, and not the feed, is the major source of intestinal NAN supply for absorption and utilization by the ruminant animal. It is, therefore, very important to maintain ruminal conditions that support maximal bacterial protein yield. Treatments to protect feed protein from microbial degradation in the rumen can increase the efficiency of feed utilization, by increasing the flow of feed NAN into the intestinal tract, but such treatment must not deprive ruminal bacteria of the necessary available N, including that in the form of peptides. Alternatively, the protein supplements treated to reduce their microbial degradation in the rumen may be mixed with readily degradable proteins to provide the N substrates required by bacteria and to maximize the utilization of feed protein by the ruminant.

EXPERIMENT B—LACTATING DAIRY COWS

The experiments described in this Section were done in collaboration with Dr. A. S. Atwal, Centre for Food and Animal Research Agriculture and Agri-Food Canada, Ottawa, Canada. Nutrient requirements of cows increase with milk yield (35) and, soon after calving, dry matter intake does not provide adequate amounts of nutrients for high producing cows. In early lactation, these cows mobilize energy and protein from the limited body stores to support milk production (36). The persistence of protein deficiency quickly influences the nutritional and productive status of cows in early lactation (37).

The soybean meal treated (Tr-SBM) by the technique of the present invention was compared with untreated soybean meal (SBM) at two levels of dietary protein in a typical, corn silage-alfalfa forage-grain based TMR for feeding to cows in early lactation.

MATERIALS AND METHODS

ANIMALS AND THEIR MANAGEMENT

Forty-eight multiparous Holstein cows were used in this experiment. After parturition, each cow was offered 5 kg/d of long alfalfa hay and a high protein, protected SBM based TMR for ad libitum intake, i.e., Diet 4 (Table 7). The amount of long hay offered was reduced slowly to 1 kg/d by the end of wk 2 of lactation. All cows were given the Diet 4 until assigned to the four experimental diets (Table 7).

The proportion of the different dietary components were adjusted once a week based on oven DM. Amounts of forages, pelleted concentrates (Table 8) and SBM or Tr-SBM (in mash form) needed for all the cows on a dietary treatment were weighed into an Uebler Mixing Cart (Uebler Manufacturing, Vernon, N.Y.), mixed thoroughly, and measured out for individual cows to allow 5 to 10% orts. Freshly mixed TMR was fed twice a day at 1000 and 1700 h; at each feeding, 10 g Butter Aid (Ralston Purina Canada, Inc., Woodstock, Ont.) and 250 g dry molasses were top dressed; and 500 g lots of long alfalfa hay were fed at 0600 and 1730 h.

Cows were housed in a tie-stall barn, milked at 0600 and 1630 h, and allowed exercise in a dry yard between 0800 and 1000 h daily. Weighbacks were taken at 0800 h.

DIETS AND EXPERIMENTAL DESIGN

Four dietary treatments (Table 7) compared were 15% CP diets containing 4.3% CP as SBM (Diet 1) or Tr-SBM (Diet 2) and 17% CP diets containing 6.7% CP as SBM (Diet 3)

or Tr-SBM (Diet 4). For the entire experiment, a large lot of SBM was obtained from Ralston Purina Canada, Inc., and a part of this was used to prepare Tr-SBM in 4 t lots.

Cows producing more than 30 kg $d^{-1}$ milk in wk 4 of lactation were selected for this experiment. As cows became available, the cows in each set of four were assigned randomly to the four dietary treatments, at the beginning of wk 5 of lactation. Weeks 5 and 6 were considered as adjustment periods, and experimental data were collected in wks 7–16 of lactation.

Every week, milk samples were taken at four consecutive milking for fat, protein and lactose determinations. Feed components were sampled once a week, and silage samples were stored at −20° C. until analyzed.

DIGESTIBILITY STUDIES AND ANALYTICAL METHODS

For each treatment, four cows were selected at random and continued on the same diet in wk 17–18 of lactation. Methods used for conducting the digestibility trials; the analyses of feed, feces and milk; and for calculating solids corrected milk (SCM) were the same as referred to earlier (38).

STATISTICAL ANALYSIS

The data on milk production, chemical components of milk, and SCM were analyzed according to a factorial design. The analysis of variance (ANOVA) was used to examine the data. Preliminary analyses indicated no significant (P=0.05) replication effect; consequently, this term was included in the residual mean square. Terms in the model were level of CP (15% vs 17%), SBM treatment (Tr-SBM vs SBM), and the level of CP by soybean treatment interaction. For the milk production data collected during weeks 7 to 16, the corresponding average response during weeks 3 to 4 was used as a covariate. The treatment means were compared by non-orthogonal t tests.

The data of chemical composition of diets and digestibility co-efficients were analyzed by one-way ANOVA (39), and treatment means were compared by Duncan's multiple range test. Significance was at P=0.05 throughout unless otherwise indicated.

RESULTS

FEED INGREDIENTS AND DIGESTIBILITY

All feed ingredients used were of excellent quality and their chemical composition is shown in Table 8. Six batches of Tr-SBM showed 85–94% protection of CP in 24 h incubations of samples in nylon bags placed in the rumen of cannulated cows. Total mixed diets were equal in NDF, ADF and ADL and their respective concentrations were 272, 177 and 17 g $kg^{-1}$ DM, respectively (Table 8). The CP content of diets 1 & 2 was 148.2 g $kg^{-1}$ DM and that of diets 3 and 4 was 167.3 g $kg^{-1}$ DM. Each cow consumed about 20 kg of these total mixed diets and 1 kg of long alfalfa hay containing 172.2 g CP $kg^{-1}$ DM. Thus for diets 1 and 2, the CP averaged 149 g $kg^{-1}$ DM and for diets 3 and 4, it was 168 g $kg^{-1}$ DM i.e. approximately 15 and 17% of DM, respectively. The high CP diet containing SBM (Diet 3) resulted in the highest values for digestibility of nutrients i.e. 69.9, 68.2, 42.1 and 42.2% for DM, CP, NDF and ADF, respectively (Table 9). Although none of these values were significantly different from the corresponding values for the other three diets; DM, NDF and ADF digestibilities of diets containing Tr-SBM, respectively, averaged 2.6, 4.0 and 5.3 percentage points lower than for the diets containing SBM. This suggests that supply of non-protein nitrogen and/or peptides for Tr-SBM diets was marginal. The digestibility of CP was also lower (6.5 percent units) for Tr-SBM diets.

FEED INTAKE AND MILK PRODUCTION

PRELIMINARY PERIOD

The cows were induced to consume maximal DMI in very early lactation by twice a day top-dressing with Butter Aid and dry molasses. As the cows reached their peak potential very early in lactation, minor ketosis cases were unavoidable but were immediately treated with Ketamalt (Pharmaceuticals, Cambridge, Ont) and glycol (50:50 by volume) as needed. By following these practices, the average DMI of 18 to 19 kg/treatment group were achieved in the preliminary period, i.e., wk 3–4 of lactation (Table 10).

The average milk (LSM, least square mean values) production in the preliminary period (wk 3 to 4 of lactation) ranged from 34.9 to 36.4 kg for the cows later assigned to diets 4 and 1, respectively (Table 10). The energy/solids corrected milk (SCM) ranged from 31.6 to 33.8 kg for the cows later assigned to Diets 3 and 2, respectively. None of these differences were statistically significant (P>0.05). Nor was there any significant difference in the daily production of fat, protein and lactose. Similarly, pooling of cows assigned to 15 vs 17% CP diets (data not shown) or SBM vs Tr-SBM diets showed no significant difference (P>0.05) in production levels during the preliminary period.

EXPERIMENTAL PERIOD

The DMI and production data during experimental period (wk 7 to 16 of lactation) were analyzed using respective data for wk 3 and 4 (when all cows were fed Diet 4) as covariates and are presented in Table 11.

For all treatments daily average DMI was about 21 kg. Tr-SBM significantly (P<0.05) increased milk production, but the effect of the two levels of dietary CP was not significant (data not shown).

The daily milk production increased by 2.2 kg (Table 11) for feeding Tr-SMB in 15% CP diet (Diet 2 vs Diet 1) and by 1.9 kg in 17% CP diet (Diet 4 vs Diet 3). The daily milk production for Diet 4 was significantly higher (P<0.05) than that for Diet 1. The difference between Diets 1 and 2 was also approaching significance (P=0.078), when using lactation wk 3 data as a covariate. Pooling the data for Tr-SBM diets vs SBM diets showed that milk production was significantly increased (Table 11) with P+0.036, using wk 3–4 data as a covariate and P=0.022 for wk 3 data as a covariate.

Use of Tr-SBM increased daily milk protein, fat and lactose production by 25.6, 54.2 and 76.3 g, respectively but these differences were not significant (P>0.05). Similarly, the effect of level of CP was not significant (P>0.05). Nor was there any significant effect on milk composition or SCM/DMI ratio. However, it may be noted that for an equal DMI for Diets 3 and 4, cows fed Tr-SBM produced about 1 kg more SCM and also showed higher average body weight gain (297.2 vs 170.5 g $d^{-1}$). The corresponding body weight gains for cows fed diets 1 and 2 were 238.4 and 213.6 g $d^{-1}$, respectively (SEM for the 4 dietary treatments was 71.2 g d−1), but none of these differences was statistically significant (P>0.05).

PERSISTENCY OF PRODUCTION

Effect of feeding treated SBM on relative milk production during lactation wk 5–16 is shown in FIG. 1. A comparison of the production in week 16 of lactation in comparison to that in week 3 of lactation (Table 12) showed that the use of Tr-SBM increased persistency of milk production in week 16 by 8.7 percentage point (P=0.02) and that of milk lactose by 7 percentage units (P=0.111). The corresponding increase in the persistency of protein production was 2.2 percentage points, but its persistency for all treatments was very high i.e. 96.6 to 100.5% for diets 1 and 4, respectively. The very high persistency of daily milk protein production suggests that the mammary gland was synthesizing milk protein at the maximal potential.

These data expressed as the numerical decrease of production from week 3 to week 16 of lactation (Table 13) provides still a clearer picture of the positive effect of Tr-SBM on milk production (P=0.015) and lactose production (P=0.088). It may be noted that relative decreases in milk, milk lactose and milk protein was reduced by 3.1 kg, 120 g and 22 g per day, respectively, for cows fed Tr-SBM compared to those fed SBM diets. It seems that this advantage of higher persistency in milk production would continue much beyond the 16 weeks of lactation studied in the present trial.

DISCUSSION

The NDF and ADF content of diets (Table 8) in the present study were very close to those in recent reports of Atwal and Erfle (38) and the low forage diets of Canale et al. (40). The high concentrate diets of Chow et al. (41) were also of similar ADF content but contained 1.24 times more NDF. The digestibilities of ADF for our SBM diets (Table 9, Diets 1 and 3) were similar to those reported by Canale et al. (40) and Chow et al. (41). But the NDF digestibility reported by Chow et al. (41) was 7 and 12 percentage units higher as compared to our study and that of Canale et al. (40), respectively. These observations suggest that the source of dietary fiber may have a more pronounced effect on the hemicellulose digestibility than that of cellulose. The effect on NDF digestibility does not seem to relate to the CP content of diets because CP was at 18.8% for the study of Canale et al. (40) and at about 17% for the other two reports. Furthermore, digestibility of DM was somewhat lower in the study of Chow et al. (44) as compared to the other two reports.

In the Tr-SBM diets, the basal ingredients provided about 11.5% CP and the addition of Tr-SBM increased it to about 15 and 17% in Diets 2 and 4, respectively. As discussed in our previous report (38), this 11.5% CP from basal ingredients is considered marginal for maximizing digestibility of DM and fiber. Consequently, digestibility of Tr-SBM diets was somewhat less than for the SBM diets, but the effect was not significant. This observation also indirectly supports the conclusion based on nylon bag data that the Tr-SBM was highly protected (85-94%) against the degradation in the rumen.

Despite the limitation of a marginal level of degradable CP, feeding of Tr-SBM diets significantly (P<0.05) increased milk production during wk 7-16 of lactation when production in wk 3-4 was used as a covariate. The average daily increase was 2.15 kg (Table 11), but the net effect in wk 16 of lactation was as much as 3.1 kg (Table 13), which suggests that the continued feeding of Tr-SBM would show a positive effect past wk 16 of lactation. This extent of increase in milk production is higher than those reported for feeding good quality fishmeal to replace SBM in 16% CP diets (38) or 18% CP diets based on alfalfa silage (42). An increase of milk production similar to that of our study was obtained in a Latin Square experiment by feeding rumen-protected amino acids (40 g L-lysine and 12.8 g DL-methionine/d) to cows producing about 30 kg milk (41). Schwab et al. (43) showed that even somewhat higher response in milk production can be attained by daily infusion of 10 g DL-methionine and 30 g of L-lysine in very early lactation, i.e., wk 4-8 of lactation, but there was no response when the trial was repeated during wk 14-18 of lactation. On the contrary, in our study, the effect of feeding Tr-SBM on milk production is more pronounced in wk 16 of lactation and is likely to be maintained over a longer part of lactation.

FORMALDEHYDE IN MILK NOT AFFFECTED BY PROTECTED PRODUCT

In order to ensure that the animals fed with the protected product did demonstrate elevated formaldehyde levels in their milk, milk samples were tested for formaldehyde content.

The cows were in the first trimester of lactation and were fed a typical North American dairy total mixed diet, containing corn silage, alfalfa forage and concentrate (35:20:45, dry matter basis), supplemented with 1 kg of long alfalfa hay per day. Daily milk production was about 36 kg, and its fat content was 3.6 to 3.9%. Dietary treatments were % crude protein as control or treated soybean meal (SBM) in a 17% total crude protein diet, i.e., Diets #2 and 4 (15), respectively.

Milk samples were collected at morning milking, immediately transported to the laboratory on ice and, within 2 h, formaldehyde content of milk was determined by our ultra specific and super sensitive HPLC technique (44, 45).

The sensitivity of this technique was estimated to be 0.0089 µg FA ml$^{-1}$ of milk. By using this method, it was found that feeding of treated SBM had no effect on level of formaldehyde in milk (Table 14). Mean ±SD values of formaldehyde (µg/ml) in cows fed control and treated SBM were 0.0302±0.0139 and 0.0244±0.0102, respectively. The range of these values for 8 to 10 cows per group was 0.014 to 0.057 for control SBM group and 0.013 to 0.037 for treated SBM fed group. These values are much less than the corresponding average values for commercial (2% fat) milk were in the range of 0.075 to 0.255 µg ml$^{-1}$.

In summary, post-milking handling of milk has the major effect on formaldehyde content of milk, whereas feeding of chemically-treated SBM had no effect on formaldehyde content of milk.

EXPERIMENT C—GROWING/FINISHING STEERS

The experiments described in this Section were done in collaboration with Dr. D. M. Veira, Centre for Food and Animal Research, Agriculture and Agri-Food Canada, Ottawa, Canada. Forty crossbred beef steers (Western tan cattle—Charolais or Simmental crossbreds) purchased in Saskatchewan were used for the experiment. All steers were housed in pens with slatted floors at 10 head per pen. Individual feed was achieved by the use of electronic headgates (Calan). All steers were given a growth promoting implant (Compudose) at the start of the experiment and were fed to appetite.

Five diets were tested (Table 15). Eight steers were randomly assigned to each diet. Each pen had two animals on each diet. All diets were supplemented with an ionophore (Bovate). In essence, the diets represented:

Diet 1—a negative control with urea providing the supplementary crude protein (CP)

Diet 2—a positive control with untreated SBM providing supplementary CP

Diet 3—a test of treated SBM plus urea providing supplementary CP

Diet 5—a test of TSBM+SBM+urea providing supplementary CP

Diet 6—a test of TSBM+SBM+urea providing supplementary CP

Diets 2, 3 and 6 had similar CP and undegradable intake protein (UIP). Diet 1 had similar CP but lower UIP than diets 2, 3 and 6, while diet 5 had a higher CP. After arriving at the Center for Food and Animal Research, (CFAR), the beef steers were put on test for a total of 56 days.

RESULTS AND DISCUSSION

The performance of steers is shown in Table 16. There was no meaningful difference in dry matter intake (DMI), but average daily gain (ADG) was clearly different between protein sources. Supplementation with SBM was no better than urea, while the TSBM+urea and the TSBM+blood meal (BM)+urea mixtures increased ADG slightly. The largest increase in ADG, 200 g/day, resulted from the TSBM+SBM+urea mixture. Feed efficiency, feed/gain ratio, reflected the changes in ADG.

During the eight weeks of the experiment, all steers had an excellent growth rate. This was a reflection of the good quality and growthy nature of the animals that were selected for the experiment. The only meaningful or practical advantage of any of the protein supplements compared to urea was the TSBM+SBM+urea mixture (Diet 6). Since the untreated SBM by itself (Diet 2) had no effect on ADG, it would appear that increasing the undegradable nature of the SBM was needed for the steers to reach their potential ADG.

CONCLUSION

The objective of this experiment was to determine whether TSBM could be used in the diet of feedlot steers to improve productivity. In the case of beef steers, there was evidence that animals with the potential for fast growth rates could benefit from dietary addition of TSBM if fed a corn silage/corn-based diet.

TABLE 1

Composition of experimental diets

| Item | Diet NSBM | Diet PSMB |
|---|---|---|
| Ingredient (%) | | |
| Corn silage | 91.85 | 91.85 |
| Soybean meal | 6.60 | — |
| Protected soybean meal | — | 7.26 |
| Zein | 0.66 | — |
| Cobalt-iodized salt | 0.38 | 0.38 |
| Limestone | 0.22 | 0.22 |
| Biofos (phosphorus supplement) | 0.15 | 0.15 |
| Vitamin mix[z] | 0.04 | 0.04 |
| Copper chloride ($CuCl_2 \cdot H_2O$) | 0.0007 | 0.007 |
| Chromic oxide | 0.10 | 0.10 |
| Chemical Analysis | | |
| Dry matter (DM) (%) | 44.0 | 44.1 |
| Organic matter (% DM) | 95.7 | 95.8 |
| Crude protein (% DM) | 13.8 | 14.4 |
| Acid detergent fibre (% DM) | 16.7 | 16.5 |
| Calcium (% DM) | 0.48 | 0.47 |
| Magnesium (% DM) | 0.21 | 0.21 |
| Copper(g g $DM^{-1}$) | 13.8 | 12.6 |
| Zinc (g g $DM^{-1}$) | 44.6 | 42.8 |
| Iron (g g $DM^{-1}$) | 245 | 307 |
| Manganese (g g $DM^{-1}$) | 21.2 | 22.2 |

[z]Supplied per kg of diet: 580 IU vitamin A and 19 IU vitamin E.

TABLE 2 pH and concentrations of nitrogen (mg 100 $mL^{-1}$) in ruminal fluid of wethers fed normal (NSBM) or protected (PSBM) soybean meal supplement

| Item | Diet NSBM | Diet PSBM | SE | Probality of significance |
|---|---|---|---|---|
| pH | 6.11 | 6.36 | 0.114 | 0.17 |
| Total N | 206 | 185 | 19.0 | 0.46 |
| Ammonia N | 18.2 | 13.2 | 2.69 | 0.24 |
| Nonammonia N | 188 | 172 | 19.2 | 0.57 |

TABLE 3

Mean concentrations and molar proportions of volatile fatty acids in ruminal fluid of wethers fed normal (NSBM) or protected (PSBM) soybean meal supplement

| Volatile fatty acid | Diet NSBM | Diet PSBM | SE | Probability of significance |
|---|---|---|---|---|
| Concentration | mmol $L^{-1}$ | | | |
| Acetic | 57.65 | 50.60 | 2.931 | 0.13 |
| Propionic | 21.50 | 15.75 | 1.669 | 0.05 |
| Isobutyric | 0.90 | 0.68 | 0.054 | 0.03 |
| Butyric | 13.30 | 9.10 | 1.085 | 0.04 |
| Isovaleric | 1.60 | 1.21 | 0.128 | 0.08 |
| Valeric | 1.26 | 0.77 | 0.096 | 0.01 |
| Total | 96.21 | 78.11 | 4.995 | 0.04 |
| Molar proportion | % | | | |
| Acetic | 60.08 | 64.73 | 1.542 | 0.08 |
| Propionic | 20.23 | 20.22 | 1.264 | 0.30 |
| Isobutyric | 0.94 | 0.87 | 0.067 | 0.52 |
| Butyric | 13.78 | 11.63 | 0.852 | 0.12 |
| Isovaleric | 1.67 | 1.56 | 0.111 | 0.52 |
| Valeric | 1.30 | 0.99 | 0.043 | 0.002 |
| Acetic: propionic | 2.72 | 3.27 | 0.238 | 0.16 |

TABLE 4

Mean flow of nitrogen (N) into the duodenum (g $kg^{-1}$ organic matter intake) and apparent stomach feed N degradability (%) in wethers fed normal (NSBM) or protected (PSBM) soybean meal supplement

| Item | Diet NSBM | Diet PSBM | SE | Probability of significance |
|---|---|---|---|---|
| Total N flow | 24.05 | 26.83 | 1.503 | 0.24 |
| Ammonia N | 1.00 | 1.06 | 0.141 | 0.77 |
| Nonammonia N | 23.05 | 25.77 | 1.497 | 0.24 |
| Bacterial N | 19.13(83.0)[z] | 15.78(61.2)[z] | 1.089 | 0.05 |
| Protozoal N | 1.19(5.1) | 1.91(7.4) | 0.256 | 0.09 |
| Feed N[y] | 2.74(11.9) | 9.08(31.4) | 1.275 | 0.03 |
| Apparent feed N degradability[y] | 88.7 | 66.5 | 5.35 | 0.03 |

[z]Data in parentheses are percentage of the total nonammonia N.
[y]Includes endogenous N secretions.

TABLE 5

Mean flow of amino acids into the duodenum of wethers fed normal (NSBM) or protected (PSBM) soybean meal supplement

| Amino acids | Diet NSBM | Diet PSBM | SE | Probability of significance |
|---|---|---|---|---|
| | g $kg^{-1}$ $OM^z$ intake | | | |
| Essential | | | | |
| Arginine | 5.28 | 6.30 | 0.537 | 0.23 |
| Histidine | 2.93 | 3.08 | 0.263 | 0.70 |
| Isoleucine | 7.15 | 7.73 | 0.474 | 0.42 |
| Leucine | 12.88 | 13.80 | 0.823 | 0.46 |
| Lysine | 9.15 | 9.78 | 0.690 | 0.55 |
| Methionine | 1.80 | 2.18 | 0.203 | 0.24 |
| Phenylalanine | 7.05 | 7.50 | 0.453 | 0.51 |
| Threonine | 7.03 | 7.33 | 0.484 | 0.68 |
| Valine | 8.05 | 8.48 | 0.453 | 0.53 |
| Total | 61.32 | 66.18 | 4.487 | 0.19 |

TABLE 5-continued

Mean flow of amino acids into the duodenum of wethers fed normal (NSBM) or protected (PSBM) soybean meal supplement

| Amino acids | Diet | | | Probability of significance |
|---|---|---|---|---|
| | NSBM | PSBM | SE | |
| Nonessential | | | | |
| Proline | 5.85 | 6.93 | 0.528 | 0.20 |
| Aspartic acid | 13.75 | 15.35 | 1.164 | 0.37 |
| Serine | 6.13 | 6.80 | 0.499 | 0.38 |
| Glutamic acid | 18.75 | 21.38 | 1.643 | 0.31 |
| Alanine | 9.90 | 10.25 | 0.650 | 0.72 |
| Glycine | 6.70 | 7.22 | 0.465 | 0.46 |
| Tyrosine | 5.43 | 6.03 | 0.428 | 0.36 |
| Total | 61.51 | 73.96 | 5.443 | 0.23 |
| Total amino acids | 127.83 | 140.14 | 9.931 | 0.23 |

[z]Organic matter.

TABLE 6

Mean disappearance of organic matter, acid detergent fibre and nitrogen from the stomach and total digestive tract of wethers fed normal (NSBN) or protected (PSBM) soybean meal supplement

| Item | Diet | | | Probality of significance |
|---|---|---|---|---|
| | NSBM | PSBM | SE | |
| | g 100 g$^{-1}$ intake | | | |
| Stomach | | | | |
| Organic matter | 50.9 | 49.3 | 2.14 | 0.62 |
| Acid detergent fibre | 41.7 | 36.1 | 2.63 | 0.19 |
| Nitrogen | −6.9 | −9.1 | 2.16 | 0.84 |
| Total digestive tract | | | | |
| Organic matter | 78.3 | 78.6 | 1.20 | 0.89 |
| Acid detergent fibre | 57.3 | 58.3 | 2.10 | 0.72 |
| Nitrogen | 75.7 | 75.0 | 2.06 | 0.81 |

TABLE 7

Composition of TMRs (g kg$^{-1}$ DM)

| Ingredients[1] and composition[2] | Diet Number | | | |
|---|---|---|---|---|
| | 1 | 2 | 3 | 4 |
| Corn silage | 350.0 | 350.0 | 350.0 | 350.0 |
| Alfalfa silage (wilted) | 100.0 | 100.0 | 100.0 | 100.0 |
| Alfalfa hay | 100.0 | 100.0 | 100.0 | 100.0 |
| SBM (55.7% CP) | 78.0 | — | 121.0 | — |
| Tr-SBM (55.7% CP) | — | 78.0 | — | 121.0 |
| Ground barley | 138.5 | 138.5 | 117.0 | 117.0 |
| Ground shelled corn | 138.5 | 138.5 | 117.0 | 117.0 |
| Megalac ®[3] | 22.9 | 22.9 | 22.9 | 22.9 |
| Dry Molasses | 22.5 | 22.5 | 22.5 | 22.5 |

TABLE 7-continued

Composition of TMRs (g kg$^{-1}$ DM)

| Ingredients[1] and composition[2] | Diet Number | | | |
|---|---|---|---|---|
| | 1 | 2 | 3 | 4 |
| Amm. phosphate (mono basic) | 9.0 | 9.0 | 9.0 | 9.0 |
| Mineral-vitamin mix[4] | 40.6 | 40.6 | 40.6 | 40.6 |
| | 1000.0 | 1000.0 | 1000.0 | 1000.0 |

[1]SBM=soybean meal; Tr-SBM=Treated-soybean meal. (formaldehyde-zein)
[2]All ingredients other than corn silage, alfalfa silage, alfalfa hay and SBM or Tr-SBM were mixed and pelleted as concentrates.
[3]Megalac ® (calcium salts of palm oil, Church and Dwight Co., Inc., Princeton, NJ).
[4]Mineral-vitamin mix provided sodium bicarbonate, Dynamate ® (magnesium and potassium sulphate, Marshall Minerals, Marshall, TX), trace mineralized salt, magnesium oxide, selenium, and vitamins A and D at 120% of the levels reported for Experiment 1 of Atwal et al. (1990), and vitamin E (dl-α-tocopherol acetate) at 300 IU/kg DM.

TABLE 8

Chemical composition of feeds and total mixed diets[1]

| | CP | | NDF | | ADF | | ADL | |
|---|---|---|---|---|---|---|---|---|
| | Avg. | SD | Avg. | SD | Avg. | SD | Avg. | SD |
| | (g · kg$^{-1}$ DM) | | | | | | | |
| Corn silage | 81.0 | 7.3 | 418.1 | 36.0 | 261.5 | 28.8 | 36.1 | 11.5 |
| Alfalfa silage (wilted) | 199.8 | 19.1 | 424.1 | 27.8 | 352.0 | 20.0 | 72.7 | 18.4 |
| Alfalfa hay | 172.2 | 17.1 | 413.5 | 65.3 | 341.6 | 30.9 | 68.2 | 9.4 |
| Ground barley | 123.7 | 9.3 | 165.5 | 28.5 | 50.4 | 10.1 | 7.5 | 1.9 |
| Ground corn | 103.2 | 12.5 | 93.4 | 23.8 | 28.4 | 3.9 | 5.0 | 3.4 |
| Soybeanmeal | 556.8 | 12.2 | 87.7 | 19.8 | 61.6 | 8.7 | 14.6 | 3.4 |
| Diets 1 and 2 | 148.2 | — | 272.7 | — | 177.0 | — | 17.0 | — |
| Diets 3 and 4 | 167.3 | — | 271.2 | — | 177.5 | — | 17.3 | — |

[1]CP = crude protein; NDF = Neutral detergent fiber; ADF = Acid detergent fiber; ADL = Acid detergent lignin.

TABLE 9

Digestibility of nutrients[1] (%)

| Diet Number | DM | CP | NDF | ADF |
|---|---|---|---|---|
| 1 | 69.4 | 65.0 | 42.0 | 41.2 |
| 2 | 67.8 | 59.0 | 38.6 | 35.7 |
| 3 | 69.9 | 68.2 | 42.1 | 42.2 |
| 4 | 66.3 | 60.9 | 37.7 | 37.3 |
| SEM | 2.08 | 2.88 | 4.15 | 4.41 |

[1]Abbreviation - as explained in Table 8.

TABLE 10

DMI, milk production and milk components for wk 3-4 of lactation[1]

| | Diets assigned after wk 4 of lactation | | | | | Protein treatment assigned after wk 4 of lactation | | |
|---|---|---|---|---|---|---|---|---|
| | 1 | 2 | 3 | 4 | SE | SBM | Tr-SBM | SE |
| DMI (kg/d) | 17.8 | 19.2 | 18.5 | 18.8 | — | 18.2 | 18.9 | — |
| Production of: | | | | | | | | |
| Milk (kg/d) | 36.4 | 35.8 | 35.7 | 34.9 | 1.1 | 36.1 | 35.3 | 0.8 |
| Fat (g/d) | 1300.3 | 1363.7 | 1241.7 | 1296.7 | 50.8 | 1271.0 | 1330.2 | 35.9 |
| Protein (g/d) | 981.6 | 1028.8 | 988.2 | 997.7 | 34.4 | 984.9 | 1013.2 | 24.3 |
| Lactose g/d | 1695.0 | 1739.7 | 1668.9 | 1747.7 | 57.9 | 1681.9 | 1743.7 | 40.9 |
| SCM[2] (kg/d) | 32.4 | 33.8 | 31.6 | 32.8 | 1.1 | 32.0 | 33.3 | 0.8 |

[1] All cows were fed Diet 4 in this preliminary period.
[2] SCM = Solids/energy corrected milk.

TABLE 11

DMI, milk production and milk components during week 7-16 of lactation[1]

| | Diet 1 | Diet 2 | Diet 3 | Diet 4 | SE | Using wk 3-4 data as covariate for probability level | |
|---|---|---|---|---|---|---|---|
| | | | | | | Treatment to SBM | CP level |
| DMI (kgd$^{-1}$) | 20.8 | 21.0 | 21.3 | 20.9 | .526 | .883 | .567 |
| Milk (kgd$^{-1}$) | 34.2 | 36.4 | 34.8 | 36.7 | .86$^{A,B}$ | .036 | .481 |
| SCM[2] (kgd$^{-1}$) | 32.0 | 33.7 | 32.1 | 32.9 | .905 | .227 | .588 |
| % in milk: | | | | | | | |
| Protein | 2.832 | 2.803 | 2.846 | 2.771 | .036 | .084 | .982 |
| Fat | 3.696 | 3.739 | 3.612 | 3.596 | .100 | .796 | .169 |
| Lactose | 4.917 | 4.781 | 4.752 | 4.801 | .036 | .194 | .081 |
| Production (gd$^{-1}$): | | | | | | | |
| Protein | 982.5 | 1021.3 | 992.1 | 1004 | 30.65 | .635 | .816 |
| Fat | 12.17 | 1360 | 1278 | 1294 | 44.2 | .235 | .320 |
| Lactose | 1692.5 | 1742.8 | 1657.0 | 1759.3 | 49.56 | .164 | .971 |
| SCM/DMI | 1.570 | 1.613 | 1.521 | 1.583 | .038 | .246 | .265 |

[1] Milk production and milk composition data for wk 3-4 was used as a covariate for the statistical analyses.
[2] SCM = Energy/solids corrected milk.
$^A$= Difference between 17% CP Tr-SBM diet and 15% - CP SBM diet (4 vs 1) was significant (P = .047).
$^B$= Difference between 15% CP Tr-SBM diet and 15% - CP SBM diet (2 vs 1) was approaching significance (P = .078).

TABLE 12

Persistency of milk and milk component production in wk 16 relative to wk 3 of lactation (%)

| | Effect of dietary treatment (Diet #) | | | | | Signi-ficance | Effect of SMB type | | | |
|---|---|---|---|---|---|---|---|---|---|---|
| | 1 | 2 | 3 | 4 | SE | | SBM | Tr-SBM | SE | P = |
| Milk | 90.2 | 98.9 | 92.1 | 100.6 | 3.59 | A,b | 91.1 | 99.8 | 2.51 | .020 |
| Milk fat | 88.3 | 94.9 | 92.0 | 88.7 | 5.67 | NS | 90.1 | 91.8 | 4.05 | .775 |
| Milk protein | 96.6 | 96.9 | 96.3 | 100.5 | 5.51 | NS | 96.5 | 98.7 | 3.99 | .687 |
| Milk lactose | 92.4 | 96.1 | 89.1 | 99.0 | 4.16 | NS | 90.7 | 97.5 | 2.94 | .111 |
| SCM | 91.0 | 95.5 | 91.4 | 93.7 | 4.57 | NS | 91.2 | 94.6 | 3.21 | .461 |

A indicates significant difference (P < .05) for diets 4 vs 1.
b indicates significant difference (P < .1) for diets 2 vs 1.
NS indicates no significant difference (P > .1).

TABLE 13

Decrease in daily production of milk and milk components in wk 16 relative to wk 3 of lactation

| | Diet number | | | | | Signi- | Effect of SMB type | | | |
|---|---|---|---|---|---|---|---|---|---|---|
| | 1 | 2 | 3 | 4 | SE | ficance | SBM | Tr-SBM | SE | P = |
| Milk (kg) | 3.6 | .5 | 3.0 | .1 | 1.19 | A,b,c | 3.3 | .2 | .84 | .015 |
| Milk fat (g) | 202 | 70 | 110 | 185 | 72 | NS | 156 | 128 | 51 | .699 |
| Milk protein (g) | 46 | 35 | 50 | 17 | 52 | NS | 48 | 26 | 37 | .672 |
| Milk lactose (g) | 140 | 73 | 198 | 25 | 68 | NS | 169 | 49 | 48 | .088 |
| SCM (kg) | 3.6 | 1.5 | 2.9 | 2.5 | 1.4 | NS | 3.2 | 2.0 | 1.0 | .417 |

A indicates significant difference (P < 0.05) for diets 4 vs 1.
b indicates significant difference (P < 0.1) for diets 4 vs 3.
c indicates significant difference (P < 0.1) for diets 2 vs 1.
NS indicates no significant difference (P > .1).

TABLE 14

Formaldehyde contact in Milk samples (μg/ml)[1]

| Control SMB | | Treated SBM | |
|---|---|---|---|
| Cow # | Formaldehyde | Cow # | Formaldehyde |
| 4 | .057 | 17 | .037 |
| 24 | .037 | 28 | .029 |
| 26 | .040 | 32 | .036 |
| 34 | .042 | 33 | .029 |
| 35 | .033 | 56 | .025 |
| 41 | .014 | | |
| 62 | .024 | 128 | .013 |
| 65 | .020 | 39 | .013 |
| 45 | .015 | 132 | .013 |
| 126 | .020 | | |
| Range | (0.014 to 0.057) | | (0.013 to 0.037) |
| Average | 0.0302 | | 0.0244 |
| SD | 0.0139 | SD | 0.0102 |

[1] Milk samples were taken when each cow has been fed respective diets for 5 weeks or more.

TABLE 15

Experimental Diets (% DM)

| | Diet No. | | | | |
|---|---|---|---|---|---|
| Ingredient | 1 | 2 | 3 | 5 | 6 |
| Corn silage | 82 | 82 | 82 | 82 | 82 |
| Corn, ground | 13.67 | 6.6 | 11.73 | 10.3 | 9.8 |
| Urea | 1.33 | — | 0.97 | 0.9 | 0.6 |
| SBM | — | 8.4 | — | — | 2.3 |
| Treated SBM | — | — | 2.3 | 1.9 | 2.3 |
| Blood meal | — | — | — | 1.9 | — |
| Min/Vit mix | 3.0 | 3.0 | 3.0 | 3.0 | 3.0 |
| CP, % | 12.1 | 12.1 | 12.1 | 13.4 | 12.1 |
| UIP, % CP | 23.0 | 29.4 | 29.4 | 36.3 | 31.3 |

TABLE 16

Effect of protein source on the performance of beef steers

| | Diet | | | | |
|---|---|---|---|---|---|
| Protein source[1] | 1 U | 2 SBM | 3 TSBM+U | 5 EM+TSBM+U | 6 TSBM+ SBM+U |
| Initial wt., kg | 222 | 228 | 229 | 235 | 233 |
| Dry matter intake, | | | | | |
| Kg/dry | 6.98 | 7.13 | 7.16 | 7.15 | 7.28 |
| Kg/100 kg LW | 2.58 | 2.59 | 2.55 | 2.51 | 2.41 |
| Average daily gain, kg | 1.77 | 1.74 | 1.88 | 1.84 | 1.97 |
| Feed/gain ratio | 4.05 | 4.11 | 3.83 | 3.94 | 3.53 |

[1] U = urea, SBM = soybean meal, TSBM - treated SBM, BM = blood meal.

REFERENCES

1. Kaufmann, W., and Lüpping, W. 1982. Protected proteins and protected amino acids for ruminants. Page 36 in Protein Contribution of Feedstuffs for Ruminants:Application to Feed Formulation. E. L. Miller, I. H. Pike, and A. J. H. Vanes, eds. Butterworth Scientific, London, U.K.
2. Tamminga, A. S. 1979. Protein degradation in the forestomach of ruminants. J. Anim. Sci. 49:1615.
3. Stern, M. D. 1985. Nutritional implications of protein and amino acid escape from the rumen. 46th Minnesota Nutrition Conference p. 47.
4. Plegge, S. D., Berger, L. L. and Fahey Jr. G. C. 1982. Effect of Roasting on Utilization of Soybean Meal by Ruminants. J. Anim. Sci. 55:395.
5. Faldet, M. A., Son, Y. S. and Satter, L. D. 1992. Chemical, in vitro and in vivo evaluation of soybean heat-treated by various processing methods. J. Dairy Sci. 75:789.
6. Peterson, B. J., Ely, D. C. and Boling, J. A. 1975. Oil coating of dietary protein for the ruminant. Internat. J. Vet. Nutr. Res. 45:349.
7. Slian, D. 1989. In vitro and in vivo rumen protection of proteins coated with calcium soaps of long-chain fatty acids. J. Agric. Sci. Camb. 112:79.
8. Ferguson, K. A. 1975. The protection of dietary proteins and amino acids against microbial fermentation in the rumen. p. 448 in. I. W. McDonald and A. C. I. Warner (ed). Digestion and metabolism in the ruminant. The Univ. of New England Publishing Unit. Armidale.

9. Clark, J. H., Davies, C. L. and Hatfield, E. E. 1974. Effects of formaldehyde treated soybean meal on nutrient use, milk yield and composition and free amino acids in the lactating bovine. J. Dairy Sci. 57:1031.

10. Wachira, J. D., Satter, L. D., Brooke, G. P. and Pope, L. W. 1974. Evaluation of formaldehyde treated protein for growing lambs and lactating cows. J. Anim. Sci. 39:796.

11. Spears, J. W., Hatfield, E. E. and Clark J. H. 1980. Influence of formaldehyde treatment of soybean meal on performance of growing, steers and protein availability in the chick. J. Anim. Sci. 50:750.

12. Broderick, G. A., Wallance, R. J. and Orskov, E. R. 1991. Control of rate and extent protein degradation. Page 541. In Physiological Aspects of Digestion and Metabolism in Ruminants. T. Tsuda, Y. Saski, and R. Kawashina, eds. Academic Press, London, U.K.

13. Ruminant nitrogen usage 1985. National Academy Press, Washington.

14. Hecker, J. F. 1969. A simple rapid method for inserting rumen cannulae in sheep. Aust. vet. J. 45:293.

15. Ivan, M. and Johnston, D. W. 1981. Reentrant cannulation of the small intestine in sheep: cannula and surgical method. 1. Anim. Sci 52:849.

16. Ivan, M. and Hidiroglou, M. 1980. The Ottawa plastic metabolism cage for sheep. Can. J. Anim. Sci 60:539.

17. Mahadevan, S. 1990. A new process for protecting soybean meal from rumen degradation. Pages 54–57 in 1990 Dairy Research Report, O.A.C. Public. No. 1290, Guelph, Ont.

18. Buckley, D. J., Veira, D. M., Nicholls, D. F., Ivan, M. and St. Amour, G. 1985. An automated device for controlleft feeding of sheep in cages or pens. Can. J. Anim. Sci. 65:273.

19. Ivan, M., Ihnat, M. and Hidiroglou, M. 1979. Effects of nitrilotiracetic acid on apparent absorption and duodenal flow of manganese, iron, zinc and copper in sheep. Can. J. Anim. Sci. 59:273.

20. Goering, G. H. and Van Soest, P. J. 1970. Forage fibre analysis. Agric. Handbook No. 379, Agriculture Research Service, U.S.D.A., Washington, D.C.

21. Weatherburn, M. W. 1967. Phenol-hypochlorite reaction for determination of ammonia. Anal. Chem 39:971.

22. Moore, S. and Stein, W. H. 1963. Chromatographic determination of amino acids by the use of automatic recording equipment. Methods in Enzymology 6:819.

23. Gehrke, C. W., Wall, Sr., L. L., Absheer, J. S., Kaiser, F. E. and Zumwalt, R. W. 1985. Sample preparation for chromatography of amino acids: acid hydrolysis of protein. J. Assoc. Off. anal. Chem. 68:811.

24. Erfle, J. D., Mahadevan, S. and Sauer, F. D. 1979. Effect of diet quality on adenosine -5'-triphosphate concentration and adenylate energy charge of tureen microbes from fistulated cows. J. Dairy Sci. 62:284.

25. John, A. and Ulyatt, M. J. 1984. Measurement of protozoa, using phosphatidyl choline, and of bacteria, using nucleic acids, in the duodenal digesta of sheep fed chaffed lucerne hay (*Medicago sativaL.*) diets. Agric. Sci. (Camb.) 102:33.

26. Neill, L., Dayrell, M. de S., Kramer, J. K. G. ahd Ivan, M. 1992. Procedure for analysis of phosphatidylcholine as a protozoal marker in ruminants. Can J. Anim. Sci. 72:717.

27. Statistical Analysis System Institute, Inc. 1985. SAS user's guide: Statistics. Version 5 ed. SAS, Cary, NC.

28. Broderick, G. A., Wallace, R. J. and Orskov, E. R. 1991. Physiological aspects of digestion and metabolism in ruminants. Page 569 in T. Tsuda, Y. Sasaki and R. Kawashima, eds. Academic Press, New York, N.Y.

29. Weller, R. A. and Pilgrim, A. F. 1974. Passage of protozoa and volatile fatty acids from the rumen of the sheep and from a continuous in vitro fermentation system. Br. J. Nutr. 32:341.

30. Satter, L. D. and Slyter, L. L. 1974. Effect of ammonia concentration on rumen microbial protein production in vitro. Br. J. Nutr. 32:194.

31. Leng, R. A. 1990. Factors affecting the utilization of poor-quality forages by ruminants particularly under tropical conditions. Nutr. Res. Rev. 3:277.

32. Rooke, J. A. and Armstrong, D. G. 1989. The importance of the form of nitrogen on microbial synthesis in the rumen of cattle receiving grass silage and continuous intrarumen infusions of sucrose. Br. J. Nutr. 61:113.

33. Chen, G., Strobel, H. J., Russell, J. B., and Sniffen, C. J. 1987. Effect of hydorphobicity on utilization of peptides by ruminal bacteria in vitro. Appl. Environ. Microb. 53:2021.

34. Hafley, J. L., Anderson, B. E. and Klopfestein, T. J. 1993. Supplementation of growing cattle grazing warm-season grass with proteins of various ruminal degradabilities. J. Anim. Sci. 71:522.

35. National Research Council 1988. Nutrient requirements of dairy cattle. 6th rv. ed. Update 1989. Natl. Acad. Sci. Washington, D.C.

36. Andrew, S. M., Erdman, R. A. and Waldo D. R. 1990. Extent and site of tissue protein and lipid mobilization during the lactation cycle in dairy cattle. Page 82 in Proc. Maryland Nutr. Conf., Baltimore.

37. Wohlt, J. E., Chmiel, S. L., Zajac, P. K., Backer, L., Blethen, D. B. and Evans, J. L. 1991. Dry matter intake, milk yield and composition, and nitrogen use in Holstein cows fed soybean, fish or corn gluten meals. J. Dairy Sci. 74:1609.

38. Atwal, A. S. and Erfle, J. D. 1992. Effects of feeding fish meal to cows on digestibility, milk production, and milk composition. J. Dairy Sci. 75:502.

39. Cochran, W. G. and Cox G. M. 1962. Experimental designs. 2nd ed. John Wiley and Sons, Inc., New York, N.Y.

40. Canale, C. J., Burgess, P. L., Muller, L. D. and Varga, G. A. 1990. Calcium salts of fatty acids in diets that differ in neutral detergent fiber: Effect on lactation performance and nutrient digestibility. J. Dairy Sci. 73:1031.

41. Chow, J. M., DePeters, E. J. and Baldwin, R. L. 1990. Effect of rumen-protected methionine and lysine on casein in milk when diets high in fat or concentrate are fed. J. Dairy Sci. 73:105 1.

42. Broderick, G. A. 1992. Relative value of fish meal versus solvent extracted soybean meal for lactating dairy cows fed alfalfa silage as sole forage. J. Dairy Sci. 75:174.

43. Schwab, C. G., Bozak, D. K., Whitehouse, N. L. and Olson, V. M. 1992. Amino acid limitation and flow to the duodenum at four stages of lactation. 2. Extent of lysine limitation. J. Dairy Sci. 75:3503.

44. Kaminski, J., Atwal, A. S. and Mahadevan, S. 1993. High performance liquid chromatographic determination of formaldehyde in milk. J. Liquid Chromatography 16:521.

45. Kaminski, J. Atwal, A. S. and Mahadevan, S. 1993. Determination of formaldehyde in fresh and retail milk by Liquid Chromatography. J. Assoc. Off. Ana. Chem. 70:1010.

What I claim as my invention is:

1. A composition for protecting a feed product comprising from about 5 to about 20% weight by volume of zein and from about 0.4 to about 0.72% weight by volume of formaldehyde in an aqueous alcohol solution.

2. The composition of claim 1 wherein the concentration of zein is about 10% weight by volume.

3. A method for protecting a feed product wherein a composition comprising from about 5 to about 20% weight by volume zein and from about 0.4 to about 0.72% weight by volume of formaldehyde in an aqueous alcohol solution is applied to said feed product.

4. The method of claim 3 comprising applying a composition to a feed product wherein the zein is present at about 10% weight by volume.

5. The method of claim 3 wherein the feed product comprises an oil seed protein meal product.

6. The method of claim 3 wherein the feed product comprises a vitamin.

7. A protected feed product coated with a composition comprising from about 5 to about 20% weight by volume zein and from about 0.4 to about 0.72% weight by volume formaldehyde in an aqueous alcohol solution.

8. The protected feed product of claim 7 wherein the zein is present at about 10% weight by volume.

9. The protected feed product of claim 8 wherein the feed product comprises an oil seed protein meal product.

10. The protected feed product of claim 9 wherein the feed product comprises which is soybean meal.

11. The protected feed product of claim 8 wherein the feed product comprises a vitamin.

12. The protected feed product of claim 7 wherein the feed product comprises an oil seed protein meal product.

13. The protected feed product of claim 12 wherein the feed product comprises is soybean meal.

14. The protected feed product of claim 7 wherein the feed product comprises a vitamin.

15. A method for preparing a composition for protecting a feed product, comprising:

a) providing a zein solution in aqueous alcohol containing from about 10 to about 40% weight by volume zein;

b) adjusting the pH of the zein solution to from about 7.4 to about 7.6; and c) adding from about 0.8 to about 1.44% weight by volume formaldehyde to the zein solution while maintaining the pH of the solution at from about 7.4 to about 7.6 to provide a formaldehyde-zein reaction mixture.

16. The method of claim 15, further comprising:

d) diluting the formaldehyde-zein reaction mixture with up to an approximately equal volume of alcohol.

\* \* \* \* \*

UNITED STATES PATENT AND TRADEMARK OFFICE
CERTIFICATE OF CORRECTION

PATENT NO. : 5,714,185
DATED : February 3, 1998
INVENTOR(S) : Subramaniam Mahadevan It is certified that error appears in the above-identified patent and that said Letters Patent is hereby corrected as shown below:

Title page, item [73], delete the entire assignee name and address and insert
-- Her Majesty the Queen in right of Canada, as represented by the Minister of Agriculture and Agri-Foods; Canada--.

In the Claims, Claim 10, Column 23, line 24, after the word comprises, delete "which is".

In the Claims, Claim 13, Column 24, line 6, after the word comprises, delete "is".

Signed and Sealed this

Thirtieth Day of June, 1998

Attest:

Attesting Officer

BRUCE LEHMAN

*Commissioner of Patents and Trademarks*